Figure 13:
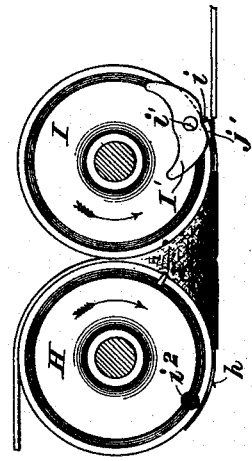

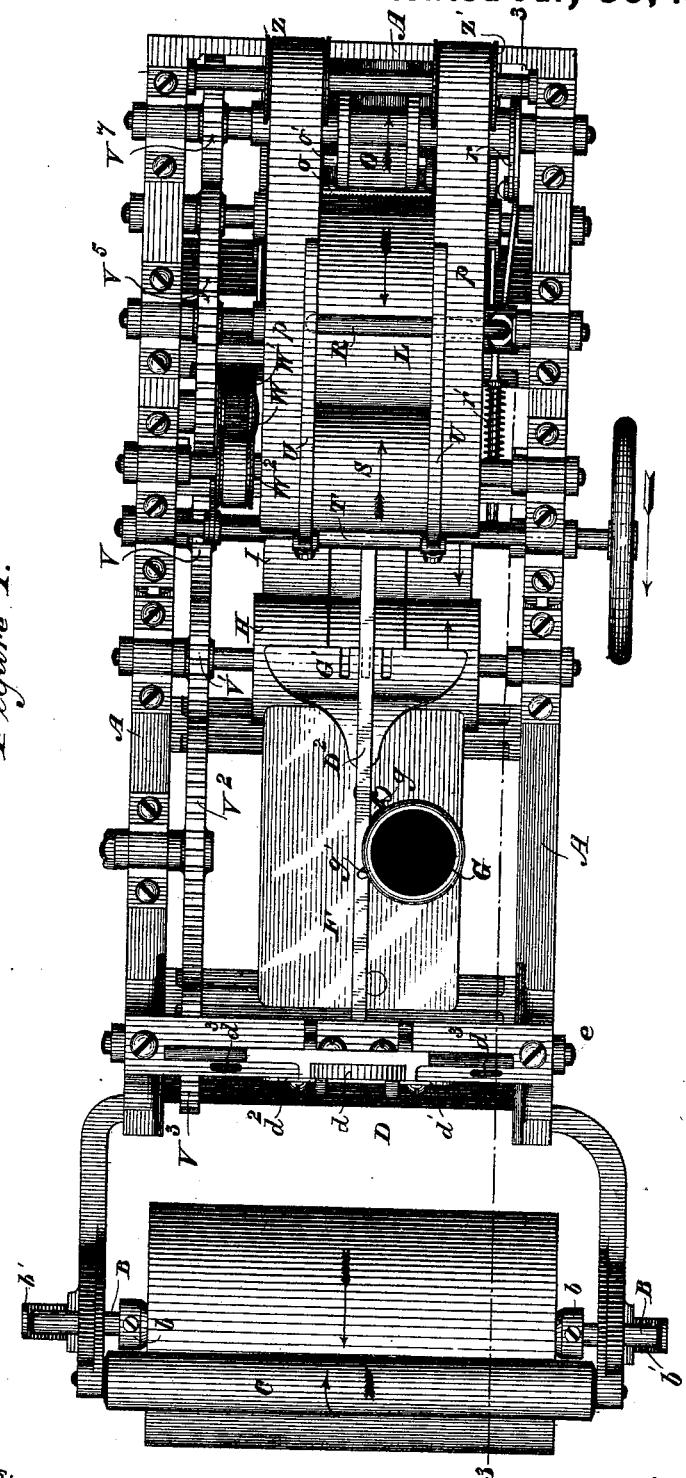

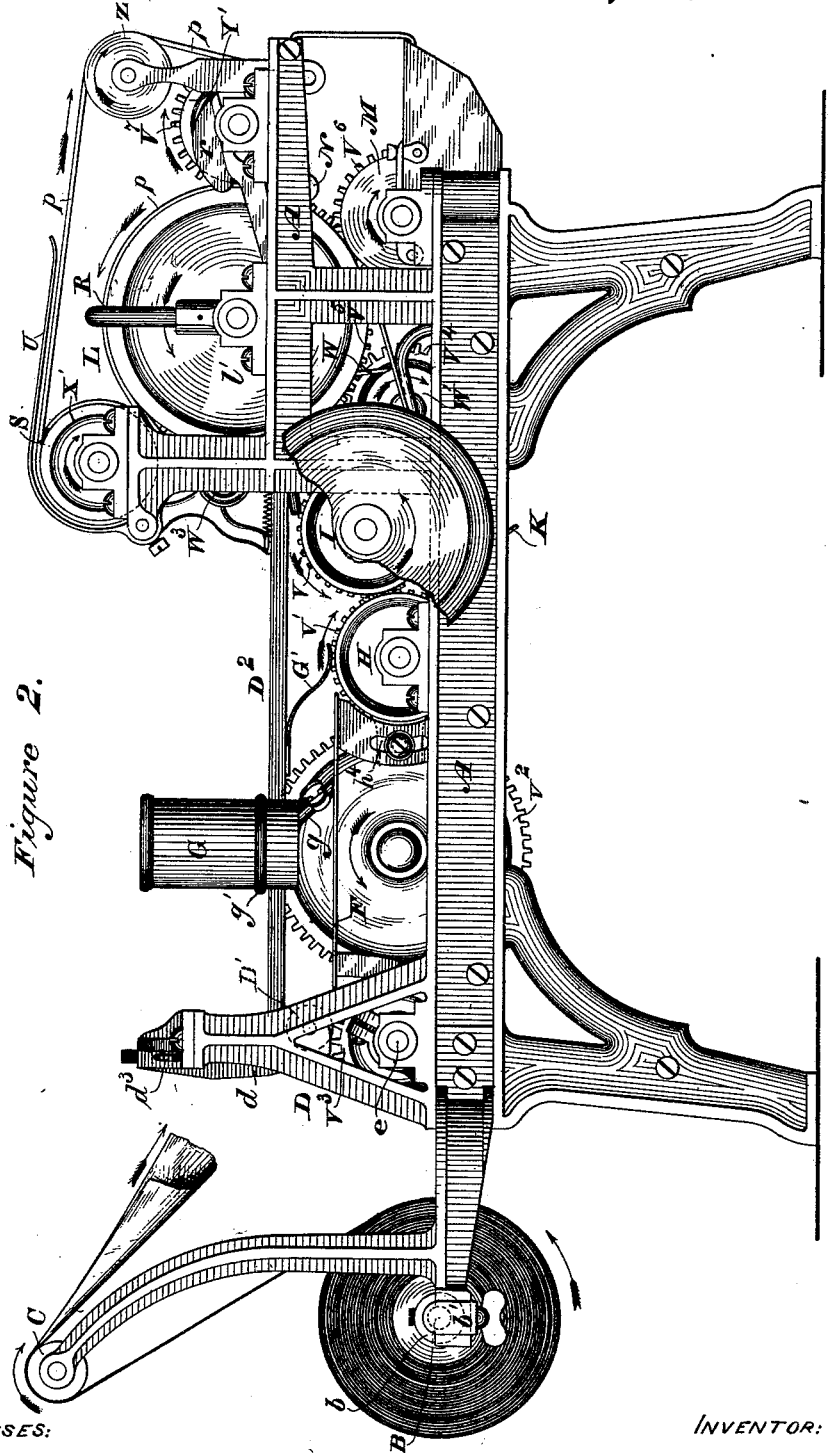

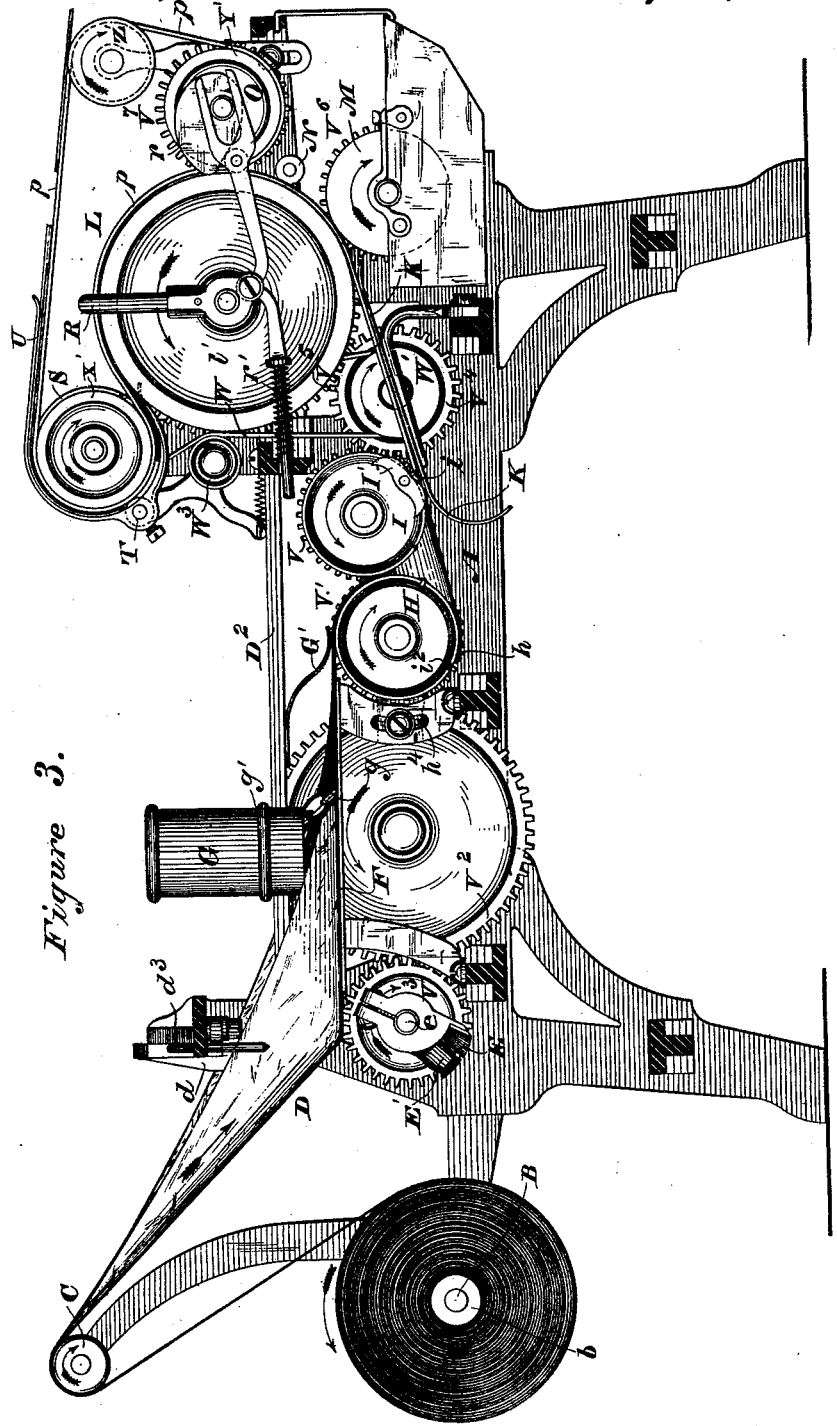

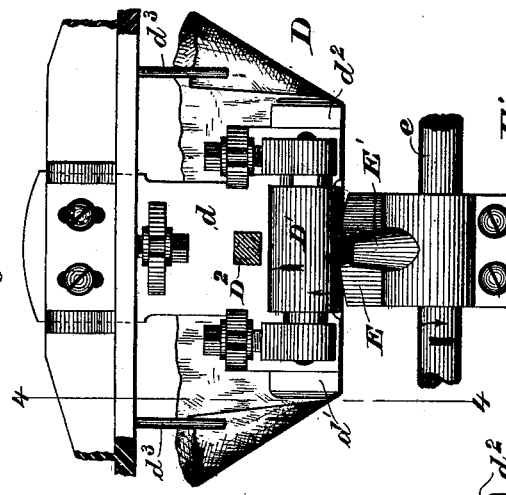
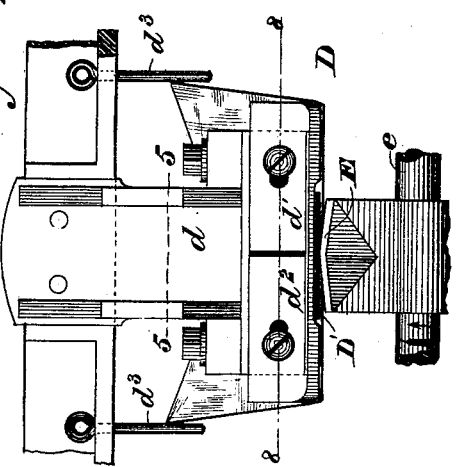
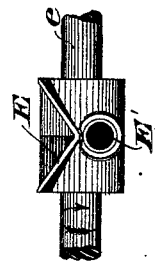
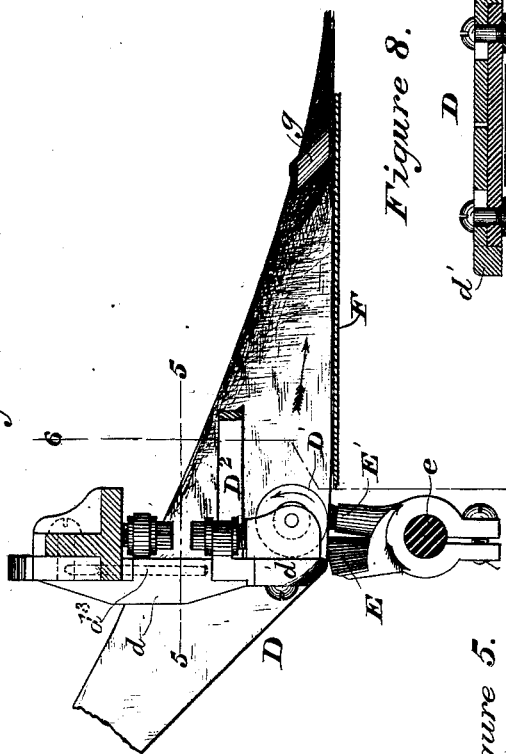
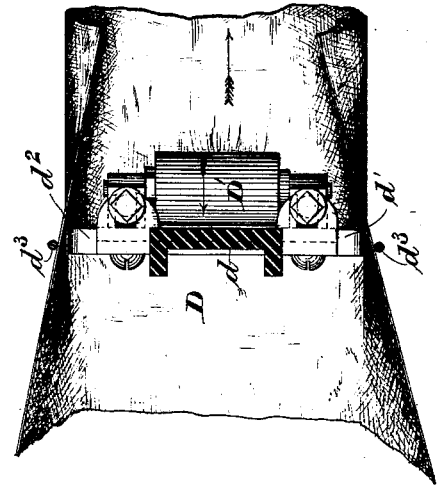

10 Sheets—Sheet 5.

C. B. STILWELL.
Machinery for Making Satchel-Bottom Paper-Bags.

No. 206,638. Patented July 30, 1878.

WITNESSES:
Wm A Skinkle
Geo W Breck

INVENTOR:
Charles B Stilwell.
By his Attorneys.
Baldwin, Hopkins & Peyton

N. PETERS, PHOTO-LITHOGRAPHER, WASHINGTON, D. C.

C. B. STILWELL.
Machinery for Making Satchel-Bottom Paper-Bags.
No. 206,638. Patented July 30, 1878.
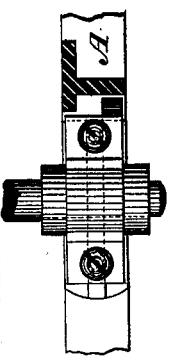
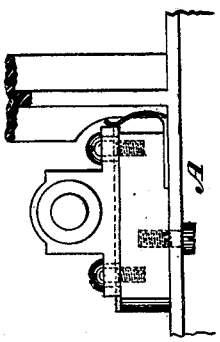
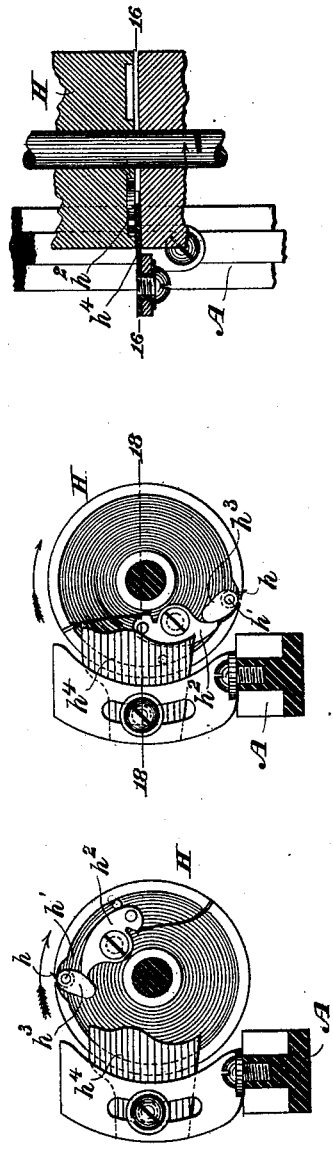
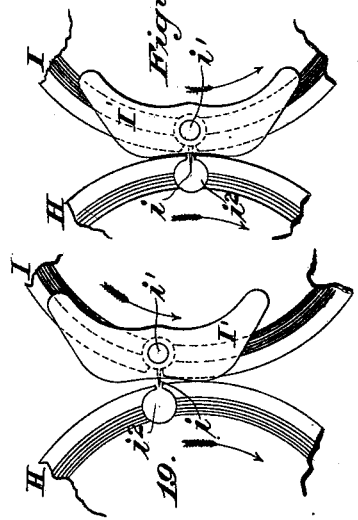
WITNESSES:
Wm A Skinkle
Geo W Breck
INVENTOR:
Charles B. Stilwell.
By his Attorneys.
Baldwin, Hopkins & Peyton C. B. STILWELL.
Machinery for Making Satchel-Bottom Paper-Bags.
No. 206,638. Patented July 30, 1878.

WITNESSES:
Wm A Skinkle
Geo W Breck

INVENTOR:
Charles. B. Stilwell.
By his Attorneys,
Baldwin Hopkins & Peyton

10 Sheets—Sheet 8.
C. B. STILWELL.
Machinery for Making Satchel-Bottom Paper-Bags.
No. 206,638. Patented July 30, 1878.
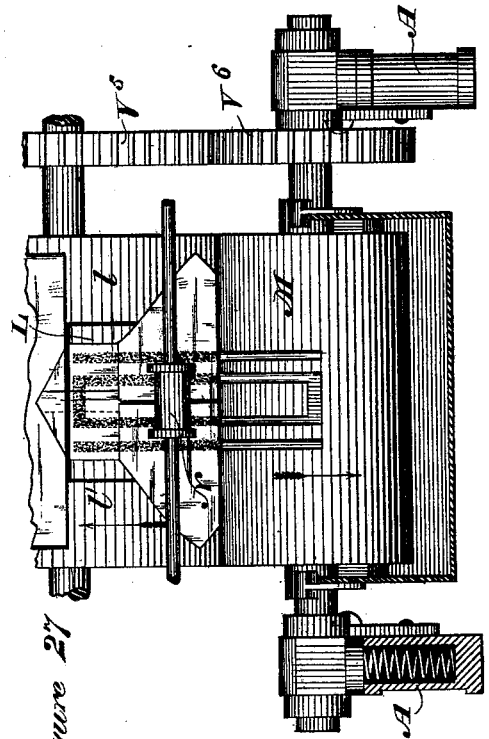
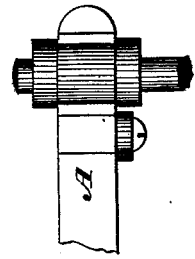
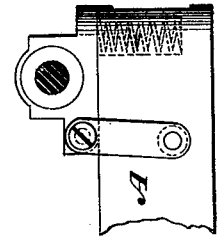
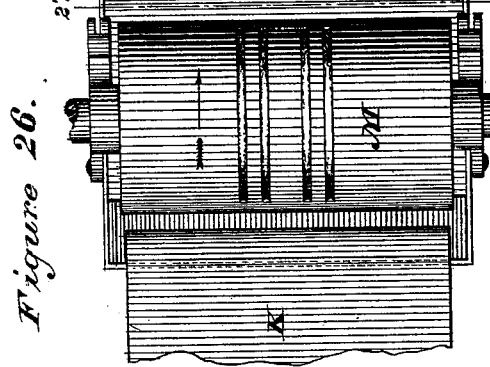
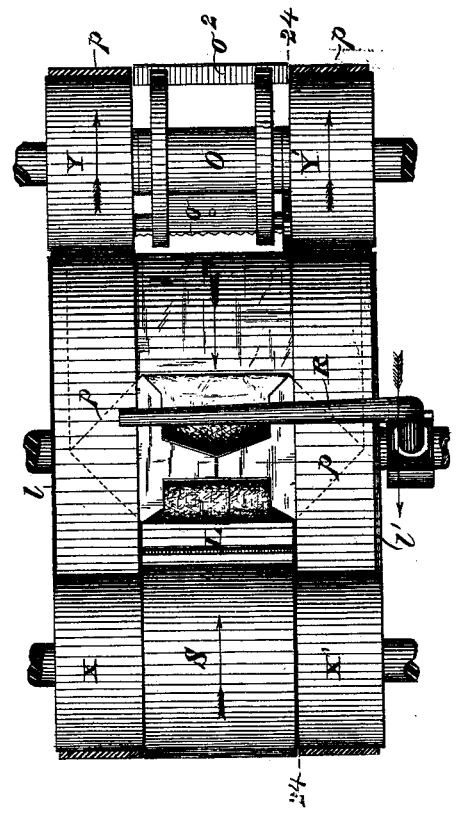
WITNESSES:
INVENTOR:
Charles B Stilwell
By his Attorneys.

10 Sheets—Sheet 9.
C. B. STILWELL.
Machinery for Making Satchel-Bottom Paper-Bags.
No. 206,638. Patented July 30, 1878.
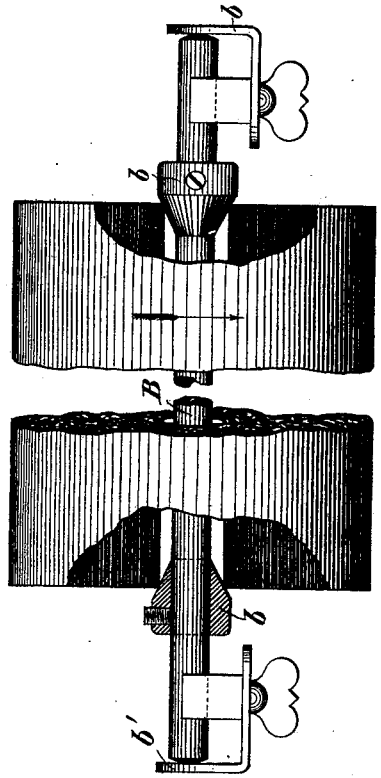
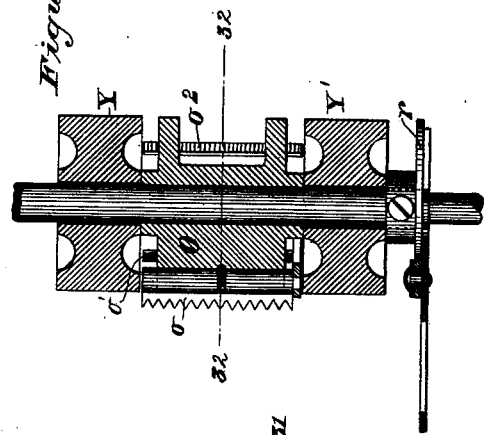
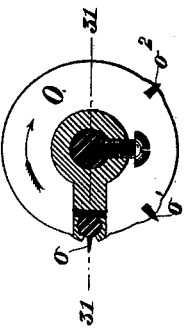
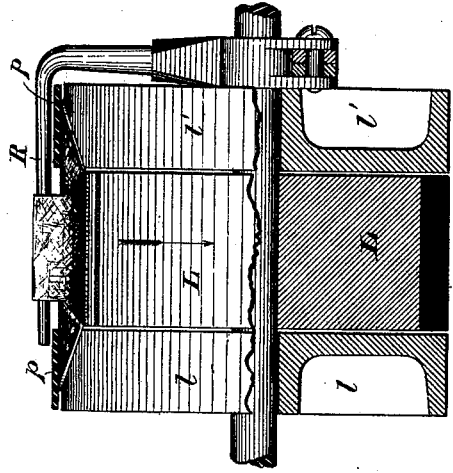
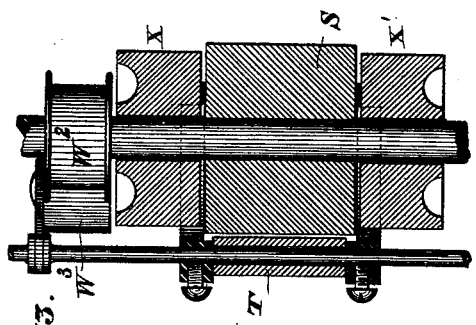
WITNESSES:
INVENTOR:
Charles B. Stilwell.
By his Attorneys.

10 Sheets—Sheet 10.
C. B. STILWELL.
Machinery for Making Satchel-Bottom Paper-Bags.
No. 206,638. Patented July 30, 1878.
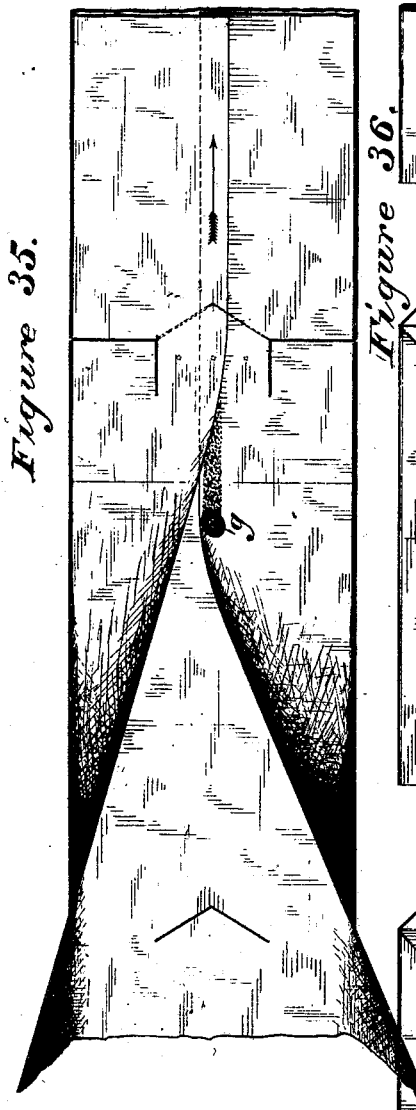
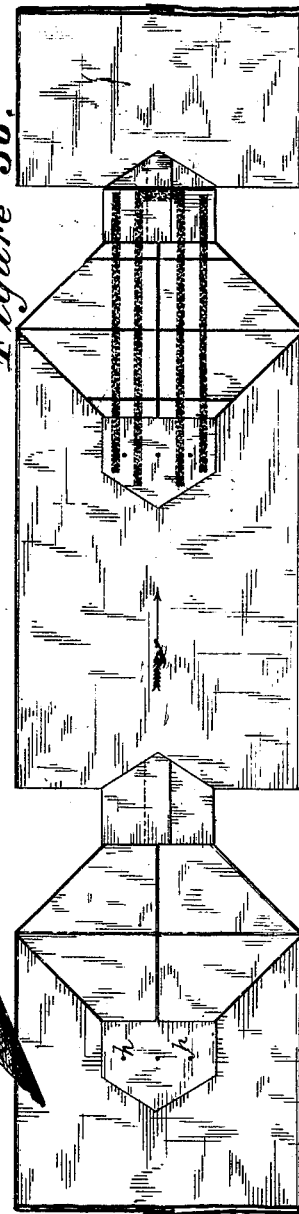
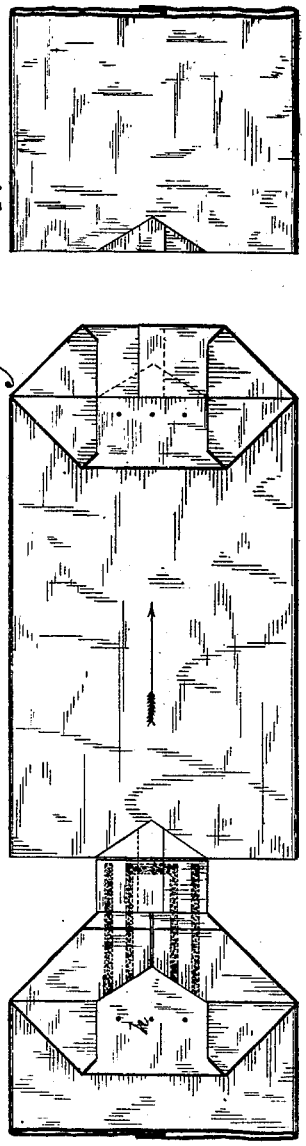

UNITED STATES PATENT OFFICE.

CHARLES B. STILWELL, OF WORCESTER, MASSACHUSETTS, ASSIGNOR TO ALFRED ADAMS, OF CLEVELAND, OHIO, AND BYRON B. TAGGART, OF WATERTOWN, NEW YORK.

IMPROVEMENT IN MACHINERY FOR MAKING SATCHEL-BOTTOM PAPER BAGS.

Specification forming part of Letters Patent No. 206,638, dated July 30, 1878; application filed June 21, 1878.

*To all whom it may concern:*

Be it known that I, CHARLES B. STILWELL, of the city and county of Worcester, in the State of Massachusetts, have invented certain new and useful Improvements in Machinery for Making Satchel-Bottom Paper Bags, of which improvements the following is a specification:

My present invention is based upon improvements in the art of making satchel-bottom paper bags and in paper-bag machinery shown in Letters Patent No. 165,381, granted to me July 6, 1875, and in an application for Letters Patent of the United States filed by me May 3, 1875, for improvements in machinery for making paper tubes.

Its purpose is to combine in one machine apparatus for forming and pasting a paper tube from a continuous web, and cutting, pasting, and folding the tubular blank thus made so as to form a satchel-bottom paper bag from a web of paper at one continuous operation, substantially in accordance with the art, method, or system illustrated in the patent and application above mentioned, but by an improved organization of mechanism.

The subject-matter claimed is hereinafter specifically stated.

In the following description the discharge end of the machine is designated as the front end, and the feeding end (or that end containing the paper roll) is designated the rear end. The right side of the machine is that side which would be on the right of the person facing the paper roll and looking toward the discharge end of the machine. The opposite side I call the left side.

The accompanying drawings represent so much of a paper-bag-forming machine embracing all my present improvements as is necessary to illustrate the subject-matter herein claimed in the best way now known to me. Obviously, however, some of these improvements may be used without the others, and in machines differing somewhat in construction and operation from the one herein shown.

The details of construction of the devices shown may also obviously be varied in different well-known ways by the skill of the workman without departing from the spirit of my invention.

Figure 12:
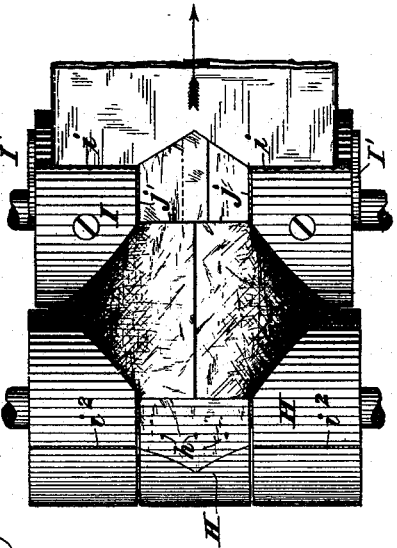
Figure 15:
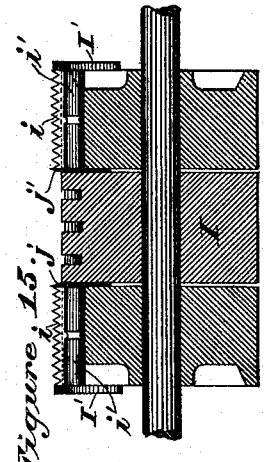
Figure 11:
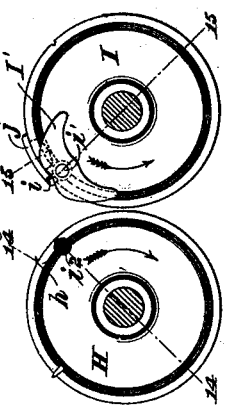
Figure 10:
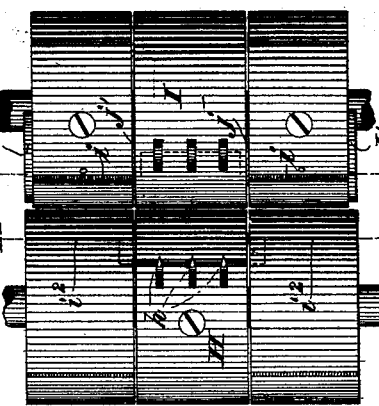
Figure 14:
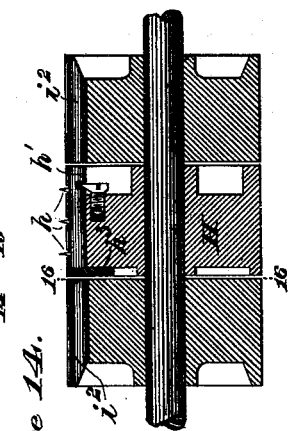
Figure 24:
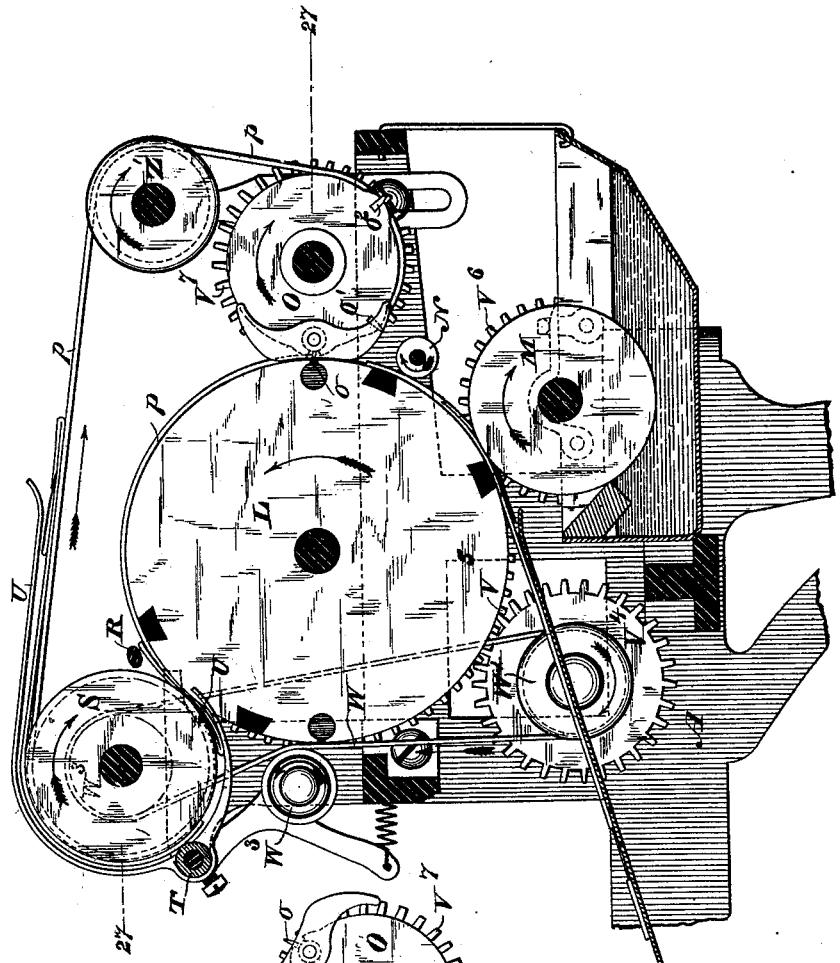
Figure 25:
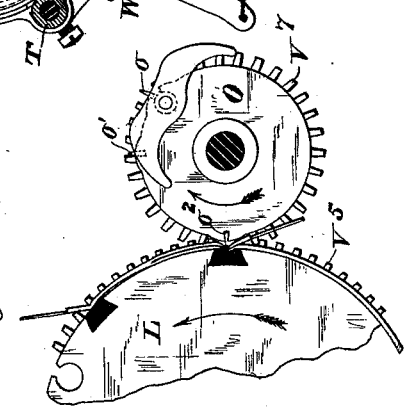

Figure 1 represents a plan or top view of the entire machine; Fig. 2, a side elevation thereof; Fig. 3, a vertical longitudinal section therethrough on the line 3 3 of Fig. 1; Fig. 4, a vertical longitudinal section on the line 4 4 of Fig. 6 through that portion of the mechanism which forms the tubular blank and makes the preliminary cut thereon; Fig. 5, a horizontal section therethrough on the line 5 5 of Figs. 4 and 7. Fig. 6 is a view in elevation of the front of the same, or that side nearest the discharge end of the machine, partly in section, on the line 6 6 of Fig. 4; Fig. 7, a view of the opposite side thereof. Fig. 8 is a horizontal section through the tube-forming plate on the line 8 8 of Fig. 7; and Fig. 9, a plan or top view of the preliminary cutter and friction-pad. Fig. 10 represents a plan or top view of the actuating-cylinders which carry the devices which partially sever the tubular blank and open its mouth to form the preliminary bottom folds, detached from the machine; Fig. 11, an end view of the same; Fig. 12, an inverted plan or bottom view of the cylinders, showing the mouth of the tubular blank as opened to form the primary folds of the bottom of the bag. Fig. 13 is a side elevation, with the parts in the same position as shown in Fig. 12; Fig. 14, a central longitudinal section through the first actuating-cylinder on the line 14 14 of Figs. 10 and 11; Fig. 15, a similar section through the other actuating-cylinder on the line 15 15 of Figs. 10 and 11; Fig. 16, a vertical transverse section through one of the actuating-cylinders on the line 16 16 of Fig. 18, showing the details of the mechanism for actuating the pins which open the mouth of the tubular blank. Fig. 17 represents a similar view of the same, with the parts in a different position; Fig. 18, a horizontal section through a portion of the same on the line 18 18 of Fig. 17. Figs. 19 and 20 are diagrams representing the cutting-knife in different positions. Figs. 21 and 22 are respectively a plan and side elevation of one of the adjustable spring-bearings of the second actuating-cylinder. Fig. 23 is a plan or top view of the final cutting, creasing, and folding mechanism; Fig. 24, a vertical longitudinal section on the line 24 24 of Fig. 23, showing the details of the final pasting, cutting, creasing, and folding apparatus; Fig. 25, a similar view of the details of the final creasing and cutting devices; Fig. 26, a plan view of the final-pasting roll and paste-vat; Fig. 27, a front elevation of the pasting mechanism, partly in section, on the line 27 27 of Fig. 26, also containing a section showing the spring-rocking bearing of the pasting-roll. Figs. 28 and 29 are respectively a plan and side elevation, showing the details of the rocking spring-bearing above mentioned. Fig. 30 is a view, partly in elevation and partly in vertical section, of the carrying and final-folding cylinder; Fig. 31, a horizontal transverse section through the final creasing and cutting devices on the line 31 31 of Fig. 32; Fig. 32, a section through the same on the line 32 32 of Fig. 31; Fig. 33, a horizontal transverse section through the final folding and discharging devices; Fig. 34, an elevation, partly in section, of the shaft which carries the roll of paper from which the bag is made and its adjusting devices. Figs. 35, 36, and 37 represent the tubular blank and bag in various stages of formation.

In this instance the mechanism is shown as mounted in a suitable main frame, A.

The paper-roll, from which the tubular blank is formed, is mounted on a shaft, B, turning in suitable bearings at the rear or feeding end of the machine, and provided with the usual adjustable conical collars $b$, for securing the roll of paper in position. The shaft is also capable of longitudinal adjustment in its bearings to vary the lateral adjustment of the paper-roll, and is held in its adjusted position by suitable adjustable stops $b'$, bearing against the end of the shaft. The web of paper passes from the roll over the usual guide-roll C, and is then deflected downward to pass under a tube-forming plate, D, depending transversely to the longitudinal central line of the machine from a cross-bar above the main frame. The paper passes downward to this tube-forming plate, in this instance, at an angle of about forty-five degrees to the horizontal line of its travel after passing the plate. The width of the plate is just equal that of the interior of the tubular blank after it is formed, and this effect of the strain upon the paper, in passing across the edges of this tube-forming plate, is to turn and fold over that portion of the paper on each side beyond the corners of the plate, or, in other words, that portion of the web which does not come in contact with the plate.

The tube-forming plate is shown in this instance as composed of three pieces, arranged in the form of an inverted T, and consisting of a vertically-adjustable stem, $d$, carrying at or near its lower edge two horizontal pieces or sections, $d^1$ $d^2$, thus rendering this device adjustable both vertically and horizontally, the horizontal adjustment adapting the plate to the formation of the tubes of different width, and the vertical adjustment adapting it to the preliminary cutter hereinafter mentioned.

Guard-fingers $d^3$, depending from the main frame on each side of the tube-forming plate, serve to maintain in proper position the upwardly-turned edges of the web during its rapid passage through the machine.

A short cutting-roll, $D^1$, preferably of rawhide, is mounted in suitable bearings, in this instance secured to the front face of the tube-forming plate, and is capable of vertical adjustment to compensate for the wear of the roll.

A cutting-knife, E, is mounted on a suitable cutter-head, which is secured by an adjustable clamp to the revolving shaft $e$, directly under and parallel with the roll $D^1$, above mentioned.

The knife, it will be observed, is made V-shaped, and moves apex foremost, so as gradually and successively to cut from front to rear as it revolves, thus, in connection with the cutting-roll, making the preliminary central transverse cut in the blank.

A rotary motion is imparted to the cutting-roll, in this instance by a friction-pad, $E'$, mounted on a cutter-head immediately in front of the knife, slightly above the line of the edge of the knife, which pad presses the paper intervening between the cutter and the roll against the latter with sufficient force to cause its surface to travel at the same rate of speed as the edge of the knife just before the contact of the knife and roll.

A supporting-plate, F, bridges the space between the tube-forming plate and the actuating, feeding, cutting, and drawing rolls H and I.

A longitudinal bar, $D^2$, serves to brace the tube-forming plate against the strain of the paper, and also as a support for the paste reservoir or cup G. A feed-tube or escape-pipe, $g$, leading from this reservoir or cup, supplies a line of paste to one edge of the web constituting the blank just previous to the pressing down of the fold to complete the tube. This escape-pipe also performs the function of a guiding-finger for holding down one edge of the blank. The reservoir is mounted in a swinging or adjustable bracket, $g'$, which permits the paste-tube $g$ to be adjusted horizontally to vary the line of the deposit of the paste relatively to the edge of the paper.

As the now-formed tubular blank passes from the supporting-plate F it is seized by pins $h$ on the first actuating-cylinder, H, which pins pass through both plies of the blank, which is then carried forward between this roll and the cutting-cylinder I. These pins, it will be observed, occupy the central portion only of the cylinder H.

To prevent the rise of the paper from the cylinder under the pressure of these pins, I employ a perforated, slotted, or toothed guard-plate or comb, $G'$, between which and the cylinder H the paper passes.

The two actuating-rollers H and I co-operate to perform the following functions: first, to draw and feed forward the paper; second, to cut and slit it; third, to open the mouth of the tubular blank and partially make the first fold. Each of these cylinders is shown in the drawings as made of three parallel sections; but they may, if preferred, be made in a single piece, either mode of construction being old and well known.

The feeding of the paper, it should be observed, is due solely to the friction on the paper in passing between the cylinders.

The perforating-pins $h$ are mounted on a rock-shaft, $h^1$, turning in suitable bearings in the cylinder H, near its periphery. These pins normally protrude from the surface of the cylinder with a forward inclination, to more securely engage or hold the paper, and are normally locked in this position by means of a spring-latch, $h^2$, engaging with a short arm or lever, $h^3$, on the rock-shaft, the lever being released at the proper time by the action of an adjustable cam, $h^4$, on the frame, against which cam the latch is carried by the rotation of the cylinder. When released from the latch the rock-shaft is free to oscillate in its bearings. (See Figs. 16, 17, and 18.)

Cutting-knives $i$, which may be either plain or serrated, are mounted on a rock shaft or shafts, $i^1$, oscillating in suitable bearings in a cylinder, I, parallel with the axis and near its periphery, this oscillation being controlled by cams I′ mounted on the ends of the rock-shafts, and actuated by contact with the opposite cylinder H as the cylinders H and I revolve. (See Figs. 10, 15, 19, and 20.)

The opposite cylinder H is provided with a corresponding slit, $i^2$, the interior of which is made larger than its exterior, for a purpose hereinafter explained.

I have found in practice that the method heretofore generally employed of cutting by a knife working radially relatively to the axis of the cutting-cylinder, as ordinarily employed in printing-presses, does not act as efficiently as desirable in a machine running with the speed required in making bags, and have therefore so organized the apparatus that the cutter always enters and leaves the recesses in the opposite cylinder in a plane parallel with that passing through the axes of said cylinders, as shown in Figs. 19 and 20; and as it is desirable to have the openings in which the knives enter in making the cuts as narrow as possible, to prevent the impression or indentation of the paper in the groove, and to insure the more perfect severing of the paper, it is necessary to make the bottom of the slits wider, to give room for the free movement of the oscillating knife, as its plane is changed relatively to the radius of the cylinders in their revolution, thereby securing efficient action at any speed desired.

The knives in the present instance, it will be observed, are mounted in the outer sections of the cylinder I, and the holding-pins on the central section of the opposite cylinder H, as this organization is necessary to make a bag of the kind shown; but this arrangement might obviously be altered to adapt it to the manufacture of bags of different styles.

The slitting-knives $j\ j'$ are arranged on each side of the central section of the cylinder, with their front edge intersecting the corresponding inner edge of the cutting-knives above mentioned, so as to form parallel slits on each side of the central line of the blank, as shown in Fig. 35.

In operation, the blank, as it passes under the tube-forming plate, has a central V-shaped cut made in it, as shown in Fig. 35. The edges are then folded over and pasted. As the blank passes under the guard-plate the pins on the roller H perforate it. The blank then passes down between the cylinders H and I, its edges being then severed with transverse cuts, (the inner ends of which join the ends of the V-shaped cut above mentioned,) and is then slit longitudinally, by parallel knives on opposite sides of the seam, at the junctions of the outer cuts and the V-shaped cut, as shown in Fig. 35, leaving the central portion of the blank connected by the upper ply or seam only, which portion of the blank is a connecting-strip with the preceding blank, and insures the continuity of the feed of the blank through the machine.

The ply, which adheres to the cylinder I in its onward passage, is necessarily withdrawn from the pins on the cylinder H, while the opposite ply is retained by them and carried in the opposite direction around the cylinder H until the strain upon the paper thus produced causes the outer edges of the blank to be drawn inwardly upon itself, making the preliminary or opening fold of the bottom of the bag, as shown in Figs. 12 and 13, when the pins are unlocked by the latch coming in contact with the cam, and are free to oscillate, permitting the withdrawal of the flap from the pins by the strain on the paper itself. The partially-folded blank is then carried forward under the cylinder I, and over the breaking and supporting plate K, to the carrier-cylinder L, passing between it and the pasting-roller M, which prints the paste upon it in a well-known way. (See Figs. 24, 26, 27, and 36.)

The carrier-cylinder L is, by preference, made in three sections, the central one of which is revolved positively at a definite rate of speed by gearing, while the outer sections, $l\ l'$, revolve loosely on the shaft, or independently of it, their speed being dependent upon that of the holding and carrying belts $p\ p$, which are driven at an accelerated speed to produce a given strain upon the paper after it leaves the actuating-cylinders H and I, to assist the opening of the blank and the formation of its preliminary fold.

A small supporting-roll, N, retains the blank in place on the carrier-cylinder after being cut, as hereinafter mentioned. The pasted blank is then severed by a knife, $o$, carried by cylinder O, and operated in a manner similar to those of the cylinder I, the knife, however, in this instance being arranged on the central section of the roller to sever that portion of the blank left unsevered by the preceding cutters, and operating in creases in the positive central section of the carrier-cylinder L.

The circumference of the carrier-cylinder must necessarily be a multiple of the length of the tubular blank from which the bag is made, but may vary in size relatively thereto.

Creasing-blades $o^1$ $o^2$ on the cylinder O now go into action, and crease the blank by pressing it into recesses or compressing it against yielding pads on the periphery of the carrier-cylinder, in a well-known manner.

Just after the blank is severed it passes under carrier-bands $p$ $p$, traversing over suitable rollers, which bands retain it upon the surface of the carrier-cylinder. At this moment an oscillating folding-arm, R, travels over the cylinder in the same direction with but more rapidly than the cylinder, and forms the first of the final folds. (See Fig. 23.) This folder is shown, in this instance, as consisting of an overhanging arm projecting over the cylinder, and mounted on a shaft so as to turn independently of it, or on an axis coincident therewith. It might, however, be mounted eccentrically, if preferred. This arm is oscillated by the conjoint operation of the cam $r$ and spring $r'$ in a well-known way, (clearly shown in Fig. 3 of the drawings;) but it might obviously be operated in various well-known ways, such as by a crank, or by positively-acting cams.

As the forward edge of the blank has been turned upward by the act of creasing it, so as to cause it to project slightly above the cylinder, it strikes against a roller, S, and is folded back upon the first bottom fold, the oscillating arm remaining in contact with the first fold until the second one is folded back upon it, thus completing the fold on the bottom of the bag. The folded blank is then carried by the bands around roller S, with its pasted side conforming to the curvature thereof, and is pressed in its final flattened condition by the compressing-roll T. The folded and compressed blank is then carried around between the roller S and guide-fingers U, and discharged at the front of the machine. The guide-fingers also strip the bag from the carrying-cylinder.

The operating parts of the machine—the primary cutter, the actuating rolls, the carrier-cylinder, the pasting-cylinder, and the final creasers and cutters—are positively driven by gearing, and are so connected and timed as to insure the successive and exact operation of each part upon the blank in its proper place and time. The oscillating folding-arm, in this instance, is thrown forward in the direction of the traverse of the paper by a spring, and returned by the action of a cam fixed positively upon the shaft which carries the final cutter and creasers. The holding and carrying bands are driven by the final-folding roll, which roll is driven faster than the geared cylinders by a belt receiving its motion from a pulley attached to an intermediate gear beneath. I deem it unnecessary, therefore, to describe here the details of arrangement of the driving-gear, as it is clearly shown in the drawings, and can obviously be greatly varied without departing from the spirit of my invention.

The direction of movement of the various parts is indicated by the arrows.

The operation of the machine will readily be understood from the foregoing description.

I do not broadly claim herein either a tube-forming plate, a preliminary cutter, or a cutting-roll by themselves, but limit myself to the combinations and organizations of the instrumentalities hereinafter claimed.

I also disclaim all combinations other than those hereinafter claimed, as the other instrumentalities and organizations of mechanism embodied in this machine, and claimed by me as of my own invention, constitute the subject-matter of another application for Letters Patent filed by me simultaneously herewith.

I claim as my own invention—

1. The combination, substantially as hereinbefore set forth, of the tube-forming plate and the paste-cup mounted on the swinging bracket, to adjust it laterally relatively to the edge of the paper.

2. The combination, substantially as hereinbefore set forth, of the sectional actuating-cylinder, the rock-shaft mounted on the center section thereof, and carrying the oscillating pins which perforate the tubular blank to aid in opening its mouth, the locking spring-latch on the cylinder, and the releasing-cam on the frame.

3. The combination, substantially as hereinbefore set forth, of the sectional actuating-cylinder, the rock-shaft mounted on the center section thereof, and carrying the oscillating-pins which perforate the tubular blank to aid in opening its mouth, and the slotted or toothed guard-plate which insures the perforation of the paper by the pins before the blank passes between the actuating-cylinders.

4. The combination, substantially as hereinbefore set forth, of the sectional actuating-cylinder and the transverse oscillating cutting-knives, mounted on the outer sections, to make the transverse edge cuts in the tubular blank.

5. The combination, substantially as hereinbefore set forth, of two cylinders, oscillating knives, their rock-shaft and cam, mounted in one cylinder, and corresponding grooves or recesses in the other cylinder, whereby the oscillation of the knives is controlled by the action of the cam upon the cylinder.

6. The combination, substantially as hereinbefore set forth, of the cylinder, the oscillating knives, and the slitting-knives, whereby the blank is cut longitudinally and transversely on each side of the central seam.

7. The combination, substantially as hereinbefore set forth, of two cylinders, perforating-pins centrally arranged upon one cylinder, and cutting and slitting knives mounted on the other cylinder, whereby the bag-blank is cut on each side of the central seam and the opening of the mouth of the blank facilitated.

8. The combination, substantially as hereinbefore set forth, of the two actuating-cylinders, the carrier-cylinder, and the interposed break-plate, whereby the unfolding of the tubular blank is prevented.

9. The combination, substantially as hereinbefore set forth, of the break-plate, the carrier-cylinder, and the pasting-roll.

10. The carrier-cylinder, constructed, substantially as hereinbefore set forth, with a positively-driven central section, and with independently-driven outer sections moving at a greater velocity, in combination with driving mechanism substantially such as described.

11. The combination, substantially as hereinbefore set forth, of the positively-driven central section of the carrier-cylinder, its independently-driven outer sections, and the holding and carrying bands, moving at a greater speed than the central section, to maintain tension in the blank.

12. The combination, substantially as hereinbefore set forth, of the carrier-cylinder, the retaining-roll, and the rotary creaser and severing-knife, whereby the forward end of the blank is held in contact with the cylinder after the severance of the preceding blank.

13. The combination, substantially as hereinbefore set forth, of the carrier-cylinder, its traveling bands, and the oscillating folding-arm traveling faster than and overtaking the bag-blank, to form the first of its final folds.

14. The combination, substantially as hereinbefore set forth, of the carrier-cylinder, its traveling bands, the oscillating folder, and the folding-roller which forms the final fold.

15. The combination, substantially as hereinbefore set forth, of the sectional carrier-cylinder, the carrier-bands, the oscillating folder, the folding-roller, and the compressing-roller, whereby the final folds are compressed.

16. The combination, substantially as hereinbefore set forth, of the carrier-cylinder, its bands, the folding-roller, the compressing-roller, and the guides, whereby the finished blank is caused to conform to the surface of the roller after being compressed.

17. The satchel-bottom-paper-bag-forming machine hereinbefore set forth, consisting of the combination of the tube-forming, preliminary cutting, pasting, opening, creasing, carrying, final-folding, and discharging mechanisms, operating successively, as described, whereby the bags are completely formed at one continuous operation from a paper web.

In testimony whereof I have hereunto subscribed my name.

CHAS. B. STILWELL.

Witnesses:
 MAX GRIEBEL,
 M. WIRTHS.